G. A. LYON.
SUPPORTING DEVICE FOR AUTOMOBILE BUFFERS.
APPLICATION FILED JAN. 24, 1918.
1,325,731. Patented Dec. 23, 1919.
4 SHEETS—SHEET 1.
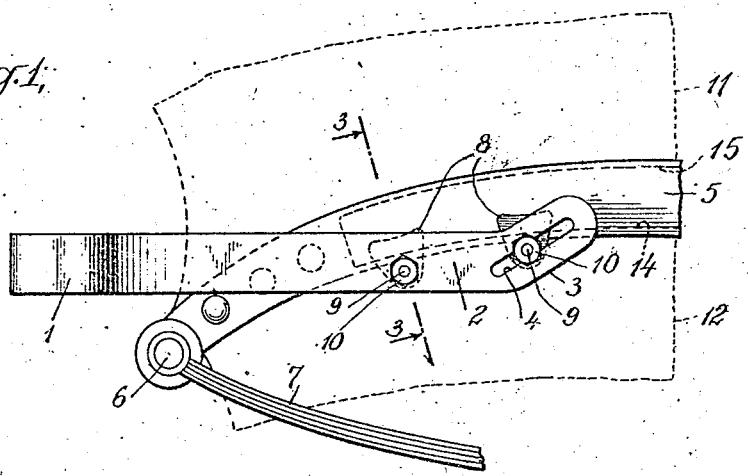
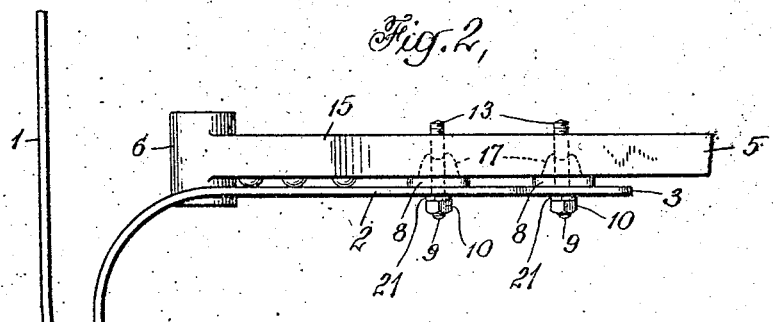
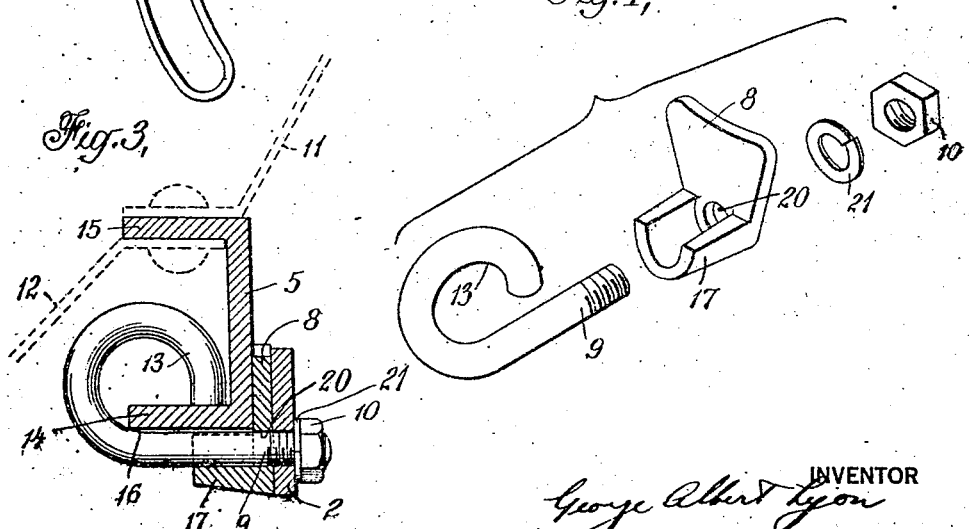
INVENTOR
George Albert Lyon
BY
Harry L. Duncan
ATTORNEY

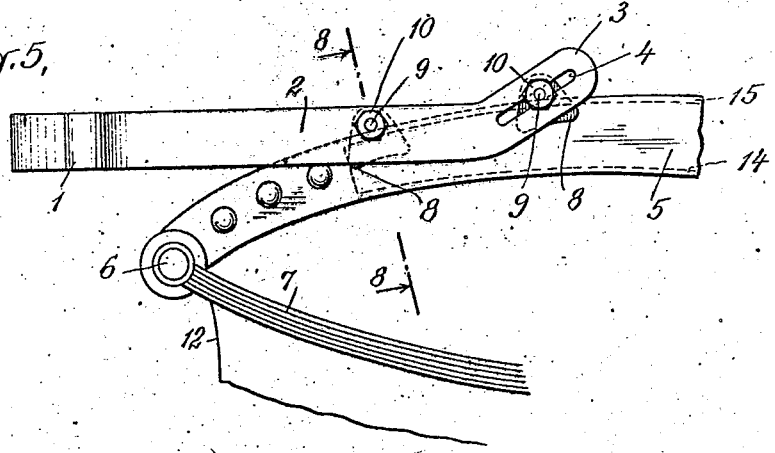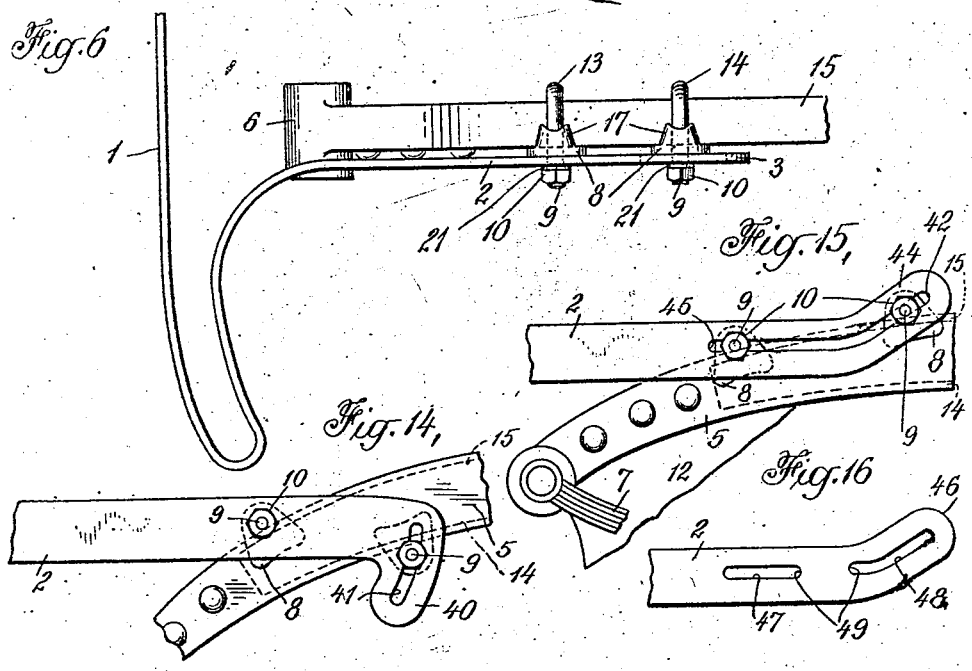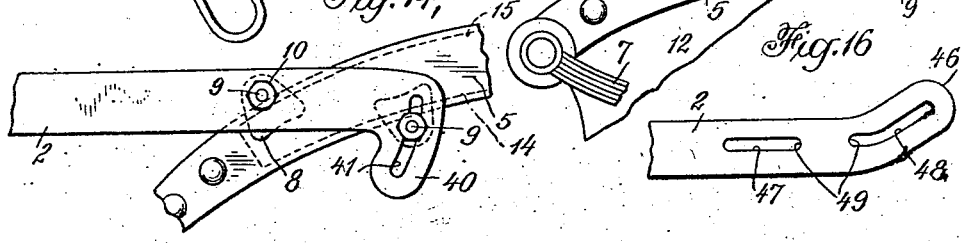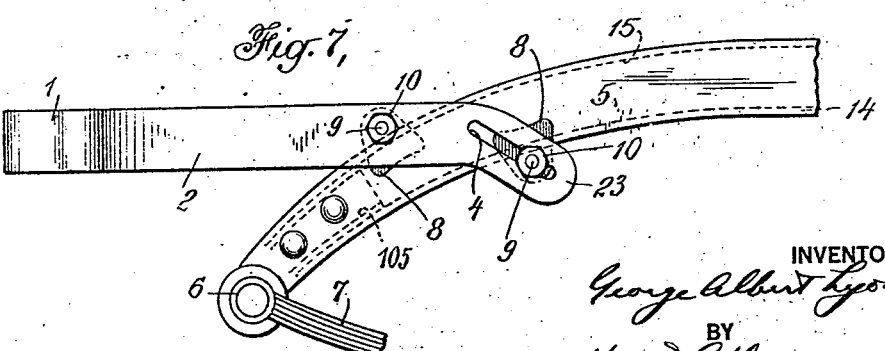

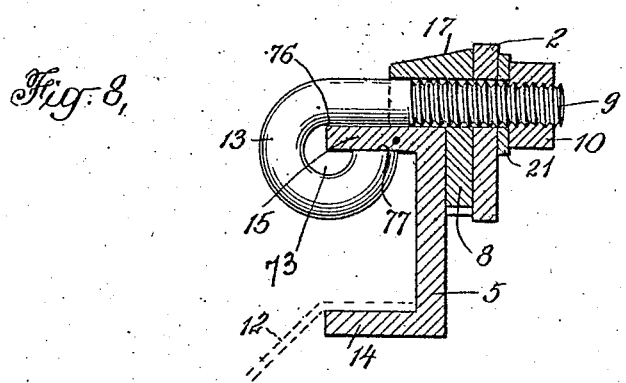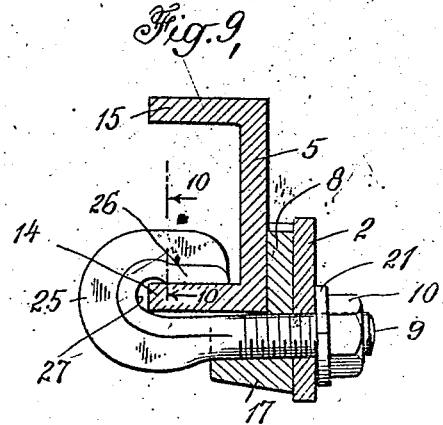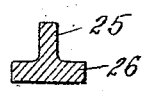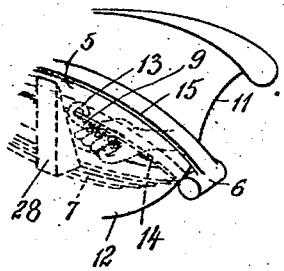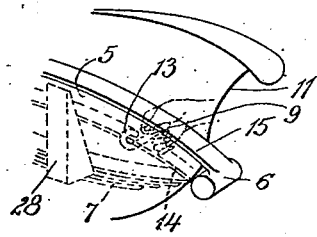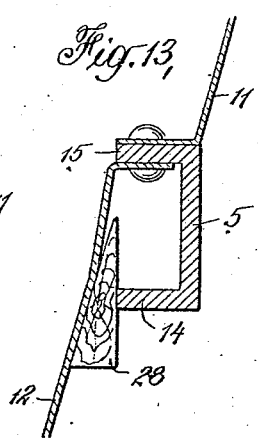

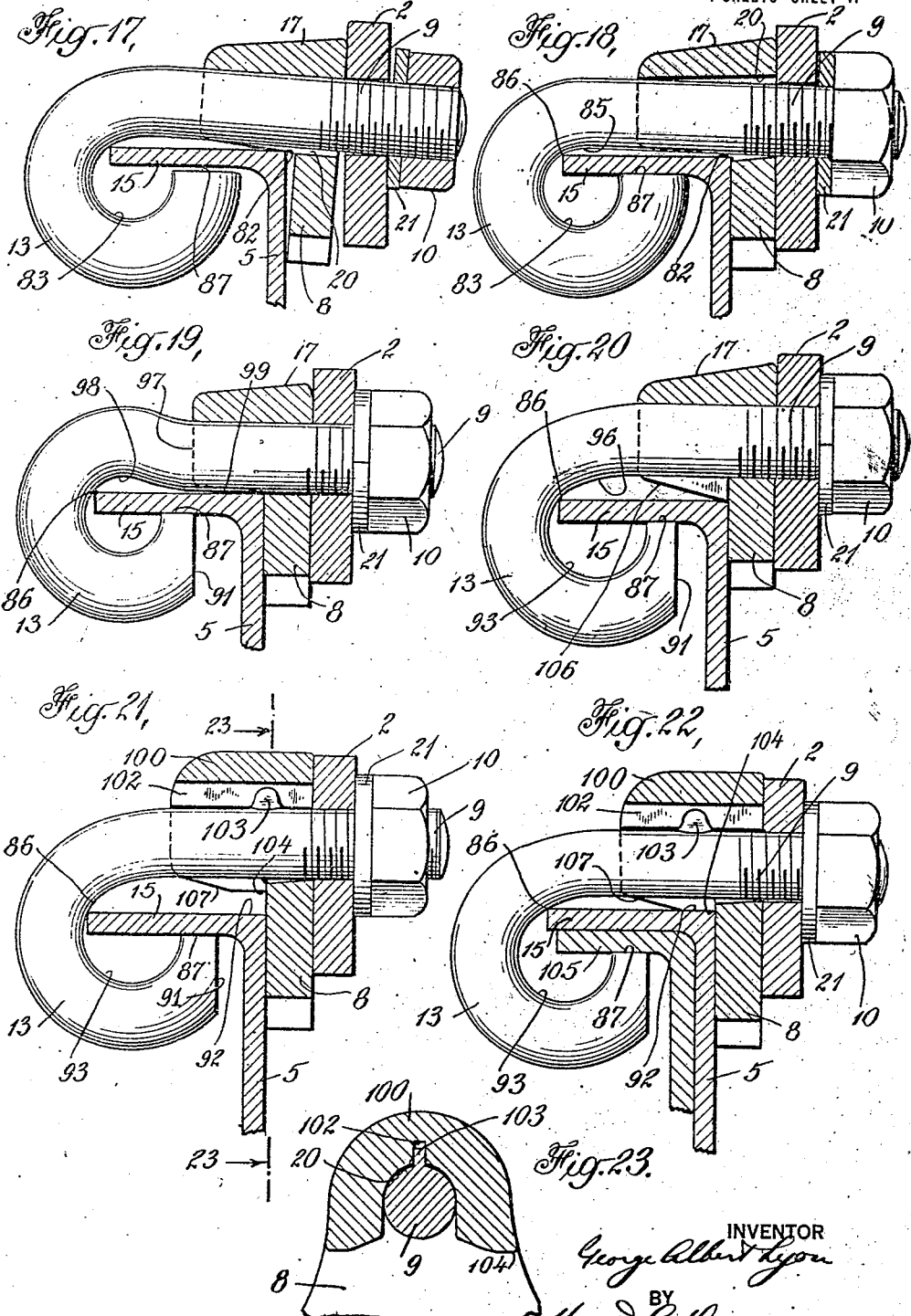

UNITED STATES PATENT OFFICE.

GEORGE ALBERT LYON, OF PHILADELPHIA, PENNSYLVANIA.

SUPPORTING DEVICE FOR AUTOMOBILE-BUFFERS.

1,325,731.

Specification of Letters Patent.

Patented Dec. 23, 1919.

Continuation in part of applications Serial No. 90,604, filed April 12, 1916, and Serial No. 135,524, filed December 7, 1916. This application filed January 24, 1918. Serial No. 213,485.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Supporting Devices for Automobile-Buffers, of which the following is a specification, taken in connection with the accompanying drawings, which form part of the same.

This invention relates especially to automobile buffer mounting devices in which one or more gripping clamping devices are arranged in coöperation with each of the channel bar frame members of the machine for securing thereto the supporting bars or members of the buffer. Self-alining retainer hooks or hook bolt clamping devices are preferably used for this purpose to lock around the projecting inner edge for instance of the upper or lower flange of the channel bar frame members and these retainer members are preferably so shaped that on tightening the nut or clamping member thereof, a wedging or clamping action is effected which maintains the retainer in proper alinement with the frame member as well as preventing withdrawal therefrom. A bearing plate or bushing member is preferably used in connection with each of the hook bolts or retainers so as to engage if desired the flange of the frame member and also its web and be interposed between the same and the supporting member of the buffer, and these bushing or bearing members are preferably so shaped or connected with the coöperating retainer as to always remain in proper alined or interposed position with respect to the buffer and frame member with the degree of movement that the bushing or bearing members have with respect to the other parts.

In the accompanying drawings showing in a somewhat diagrammatic way various illustrative embodiments of the invention, Figure 1 shows in side elevation part of one of the side frames of an automobile with a buffer bar secured thereto.

Fig. 2 is a top view of the same.

Fig. 3 is a transverse section on a large scale taken substantially along the line 3—3 of Fig. 1.

Fig. 4 is a perspective view showing in separated position the different elements of this attaching device.

Fig. 5 shows in side elevation another arrangement of an attaching device.

Fig. 6 is a top view thereof.

Fig. 7 shows still another form of attaching device for securing the buffer to an automobile.

Fig. 8 is an enlarged detail section taken substantially along the line 8—8 of Fig. 5.

Fig. 9 is a similar view to Fig. 8 showing another form of attaching member.

Fig. 10 is a transverse section through part of this member along the line 10—10 of Fig. 9.

Fig. 11 is a perspective view showing a method of applying these attaching members.

Fig. 12 is a similar view showing a further operation.

Fig. 13 is a transverse section showing one step of this attaching operation.

Fig. 14 is a side elevation showing still another form of attachment.

Fig. 15 shows still another modification.

Fig. 16 is a related detail view.

Fig. 17 is an enlarged sectional view showing another form of attaching member during application.

Fig. 18 is a similar view of the same after it has been applied.

Fig. 19 is a similar enlarged view showing a modified attaching member.

Fig. 20 shows still another form.

Fig. 21 shows still another form of attaching member.

Fig. 22 shows the same as applied to another part of the frame; and

Fig. 23 is a partial transverse section thereof taken substantially along the line 23—23 of Fig. 21.

In many cases mud guards, splash pans, or other elements of the car equipment are so mounted upon the side frame of the car that but a single flange of the latter is available for securing the supporting bar of the buffer thereto, for instance, as shown in Fig. 3 of the drawing, in which 5 represents the web of one of the channeled side frames of the car structure, said web having an upper flange 15 and a lower flange 14. The upper flange has mounted upon it, as shown by dotted lines in Figs. 1 and 3, a mud guard 11 and a splash pan 12, so as to render impracticable the use of any clamping device which embraces the frame or involves the upper flange 15 of the same.

In order therefore to provide an attaching device which can be mounted upon the other flange 14 of the side frame I may employ a bolt having a semi-circular hook member 13 whose end bears against the upper face of said flange 14, adjacent to the web 5, as shown in Fig. 3, the stem 9 of the bolt being located below the flange and projecting outwardly beyond the face of the frame and through an opening 20 in the bearing plate or bushing 8 contacting with the outer face of the frame and having a flange or extension 17 partly encircling the bolt stem and projecting beneath the lower flange 14 of the frame of the machine, as shown in Fig. 3. The flange 17 is U-shaped in cross section so as to receive the stem 9 of the bolt (see Figs. 3 and 4). The projecting portion of the stem 9 of the clamping bolt is threaded for the reception of a nut 10 whereby the rearwardly projecting supporting bar 2 of the buffer is secured to the bearing plate 8, a split lock washer 21 being, by preference, interposed between the bar 2 and nut 10, as shown in Fig. 3.

Besides the bearing of the end of the hook member 13 of the bolt upon the upper face of the flange 14 said bolt has, at the junction of the head and stem, a curved wedging face or portion 16 which bears upon the lower inner corner of said flange 14, as shown in Fig. 3, and as the stem 9 of the bolt is drawn outwardly on tightening the nut 10 this curved face of the bolt will act as a cam and serve to draw the end of the hook member 13 down on the upper face of the flange in direct proportion to the outward pull of the nut 10 upon the stem 9. Consequently said nut not only serves to secure the supporting bar 2 of the buffer firmly in position against the bearing plate 8 and the latter against the frame web 5 but it also serves to rigidly confine the bolt to the flange 14 of said frame.

As the bearing of the end of the hook 13 upon the flange 14 constitutes a fulcrum or bearing point intermediate of the ends of the straight shank 9, the clamping bolt balances itself, and is self-retaining on the frame of the car both when the bearing plate and buffer are mounted upon it, and when said buffer and bearing plate have not been secured to the bolt. In the latter case even if the bolt is only loosely applied to the frame member the weight at the inner end of the shank 9 predominates and the outer end of said shank rises until it contacts with the outer corner of the frame, and when the bearing plate and buffer bar have been applied to the bolt, the weight at the other end of the shank 9 predominates, and brings the face 16 into contact with the lower inner corner of the flange 14, as shown in Fig. 3.

In order to insure the desired vertically rigid mounting of the supporting bar of the buffer on the frame of the car two attaching bolts are employed one in advance of the other and the location of the front member 1 of the buffer in the desired position in front of the forward wheels of the car is effected by moving both of these bolts forwardly or rearwardly on the flange 14, but in order to provide for the vertical adjustment of the buffer one of the bolts is caused to act as a pivot for the supporting bar 2 and the other bolt engages a portion 3 of the bar which has formed in it an inclined or otherwise vertically extending slot 4 so that after the buffer has been adjusted to the desired position in front of the wheels it can be raised or lowered by moving the latter bolt forwardly or backwardly on the frame, thereby, through the medium of the inclined slot, 4, effecting vertical adjustment of the buffer to the desired extent.

As the plate 8 has a vertical bearing on the frame of the car and its flange 17 a horizontal bearing on the stem of the bolt, there can be no lateral rocking or twisting of said plate or of the bar 2 of the buffer, and, as vertical rigidity is insured by the use of two longitudinally separated attaching devices, it follows that the rigid mounting of the buffer on the side frames of the car is insured.

While I have shown the clamping device as applied to the lower flange of the side frame of the car, it is equally adaptable to the upper flange if said flange happen to be available, as is indicated in Fig. 5. In that case the rearwardly extending supporting bar 2 of the buffer is shown as provided with an upwardly inclined end portion 3 in which the slot 4 is formed so that one of the bolts 9 may have its self-alining retainer hook 13 locked around the upper flange 15 of the frame member, while the rear bolt 9 is adjusted in the inclined slot 4 so as to secure the desired position of the buffer and its rearwardly extending supporting bar which should be substantially horizontal as indicated in Fig. 5.

Fig. 8 shows more in detail one of the self-alining retainer hook bolts, such as are used in Figs. 5 and 6. The stem or shank 9 of the bolt merges by the gradual curve 76 of long radius, thus forming a desirable wedging clamping surface into the relatively short radius or substantially circular inner surface 73 of the hook member 13, so that the alining end 77 of this hook member is substantially parallel to the bolt shank and adapted to coöperate with the frame flange 15 adjacent its central portion. Such a retainer hook may be conveniently made by swaging a bar of steel into this form as by forcing the blank endwise into a suitably curved die so as to shape the hook end of the retainer and simultaneously somewhat upset it and stiffen the metal by this cold swaging operation. In this way a stiff heavy resilient alining hook end is secured for engagement between the other points of contact of the retainer member, the end surface 77 of this hook being of course formed and the thread cut on the shank at any suitable stages of the manufacturing process. The longitudinal movement of such a retaining member, which, for example, may be effected by screwing up the nut 10 on the bolt shank forces the wedging clamping surface 76 into engagement with the corner of the upper flange 15 of the frame member which simultaneously forces the hook end 77 into engagement with the underside of this flange and secures forcible contact between the shank of the bolt and the adjacent upper and outer corner between the upper flange and the web 5 of the frame member. In this way a three-point alining and wedging contact is secured between the wedging retainer and the flat plate or flange, since the alining end of the retainer is located between and preferably about midway between the other points of contact. This secures a firm and yet resilient contact between these parts because of the somewhat resilient pressure at the points of contact which also slightly bends the metal of the flange or plate and insures the desired alinement of the retainer, since obviously the shank or projecting end of the retainer cannot yield substantially in a vertical direction. The maintenance of the alinement of the retainer in a horizontal plane so as to prevent the shank of the retainer swinging horizontally, may be still further promoted beyond what is secured by tightening the bolt by using a bearing plate engaging the web or edge of the plate upon which the retainer is clamped and by a flange or bushing secured to this bearing plate which sufficiently encircles or engages the shank of the retainer to substantially keep it in alinement with respect thereto. This flange or bushing 17 on the bearing plate 8 preferably has its lower faces or edges 74 formed so as to be held somewhat out of contact with the frame flange 15 or other plate with which the retainer coöperates so that in this way the retainer may directly engage the plate and secure still more firm contact therewith. As shown in Fig. 5 the bearing plate 8 may have a substantially triangular form so as to secure ample bearing surface on the outside of the web of the frame member, and if desired a somewhat upwardly curved contour may be given to the depending part of this bearing plate, that is, the part farthest away from the shank of the retainer with which it coöperates. It is of course understood that such hook bolts or retainer members may be used f ⸺ ꭎring various devices to strips or to other channel bars or angle-iron members where a self-alining action is desirable and firm or rigid support needed in cases where the plate cannot be conveniently notched or drilled or completely encircled. Another form of retainer member is shown in Fig. 9 as having the shank 9 connected with a hook in which the curved web 27 is adapted to act as a wedging clamping member in connection with the lower corner of the flange 14 of the frame member in this instance, while the alining member 26 is in the form of a substantially flat surface adapted to engage the upper surface of this frame flange. This hook portion of the retainer may be stiffened in any suitable way as by forming thereon the stiffening rib 25 which can of course be readily done by manufacturing the retainer member by usual drop forging methods.

Fig. 7 shows another way in which the hook bolts or clamping retainers may be arranged on the frame member 5 of the automobile, one of the retainers or hook bolts 9 being passed through the forward hole in the side supporting bar of the buffer engaging in this instance the upper flange 15 of the side bar, while the rear hook bolt retainer 9 may coöperate with the lower flange 14 of the side bar and may have its shank passed through the downwardly extending slot 4 of the bent end 23 of the bar. It is thus seen that by the use of hook bolts of this general character, one or more of which may be turned or adjusted angularly about its shank with respect to the coöperating attaching member or side supporting bar of the buffer, the buffer may be attahed in any one of the three ways described; that is, the one or more hook bolts or retainers on each side of the buffer may all engage the lower flange of each frame member, as is shown in Fig. 1, or both hook bolts may engage the upper flange of each frame member, as shown in Fig. 5, or either hook bolt may engage the upper flange and the other the lower flange of each frame member when the bumper has been turned upside down, as shown, for example, in Fig. 7. This makes the buffer mounting practically universal in character, so that it can fit practically any style of automobile frame and also gives it a wide range of vertical and horizontal adjustment with respect thereto.

Another arrangement in which the wedging retainers engage both flanges of the side frame member of the machine is shown in Fig. 14 in which the front hook bolt or other retainer member may engage the upper flange 15, while the rear bolt engages the lower flange 14 and has its shank 9 passing through an adjusting slot 41 formed in the downwardly bent end 40 of the rearwardly projecting supporting bar 2 of the buffer. In this case also this adjusting slot 41 is given a curved form so as to extend substantially circumferentially about the other bolt 9 so that after this front retainer or clamping hook bolt has been put in place the rear bolt may be loosely adjusted and then the buffer bars swung vertically until the desired angular position has been secured. This makes the angular adjustment of the buffer somewhat more easy and convenient, but then the buffer does not have the advantage of being so firmly or securely held in position unless special arrangements are provided to prevent slip, since a mere loosening or sliding of the rear bolt or retainer in its adjusting slot varies the angular position of the buffer. However, with other forms or angular adjusting slots which secure such a vertical extent of the slots, as in the form shown in Figs. 5 and 7, any change in the angular position of the buffer necessitates a movement of one of the retainers along the frame member and the angle of the adjusting slots is preferably so arranged that frictional slipping is practically prevented under the forces tending to move the buffer vertically when collision occurs, for instance, and it is of course understood that the angle of this adjusting slot may be made still more nearly horizontal to give increased grip between the parts where desired.

Still another arrangement is shown in Fig. 15 in which the two retainers or wedging hook bolts 9 are shown in coöperation with the upper flange 15 of the side frame of the machine. These bolts are shown as coöperating with a somewhat crescent-shaped or curved adjusting slot 45 in the rear supporting bar 2 of the buffer having an upwardly turned end 44 in which the more angular end 42 of the slot is located so that a still greater range of adjustment can be secured in this way at the expense of rigidity of the buffer to some extent, unless one of the retainers is in substantial contact with one end of the adjusting slot so as to prevent substantial backward movement of the buffer member. If desired, however, this curved or crescent-shaped adjusting slot may be formed in two sections as shown in Fig. 16 in which the two slots 47, 48 in the curved end 46 of the rear supporting bar 2 of the buffer are shown as separated at their adjacent ends 49 by an intermediate connecting portion, which stiffens the buffer bar especially under vertical strains.

With some forms of automobile construction the splash pans extend down quite sharply from their point of attachment to the upper flange of the frame members of the machine as is indicated in Fig. 13 so that it is desirable to wedge or force the splash pan 12 away from the lower flange 14 of the frame member as by driving a wooden or other wedge 28 between these two parts as shown in Fig. 13 before applying the wedging hook bolts or retainers. Then when the splash pan has been forced away to the necessary extent these hook bolts may as indicated in Fig. 11 be inserted so that they are substantially parallel to the splash pan and then when the hook end 13 is properly located above the lower flange 14 of the frame member the shank 9 of the retainer bolt may be swung around horizontally or parallel to the lower frame flange into the position shown in Fig. 12 so that the shank of the bolt then projects outward beyond the connecting web 5 of the frame member so that the buffer bar and other parts, such as the bearing plate if it is used may be secured to the shank of the hook.

Another form of hook bolt retainer is shown in Figs. 17 and 18, the retainer 13 having, if desired, a threaded bolt stem 9 which may coöperate with the nut 10 and lock washer 21. The hook end 87 may as indicated be substantially flat so as to coöperate with either one of the flanges 15 of the frame member when the parts are tightened so as to assume the position indicated in Fig. 18. The alining bushing which is preferably interposed between the automobile frame member and the rearwardly projecting supporting bar 2 of the buffer which may be of the general type shown in the Lyon Patent 1,198,246, of September 12, 1916, may comprise the flat bushing or bearing plate 8 and a bushing extension 17 loosely engaging the bolt stem which may enter the oblique bolt hole 20. As seen in Fig. 17, it is easy to loosely engage these parts on the flange of the automobile frame member and they can thus be readily adjusted to the desired longitudinal position thereon. When, however, the nut 10 is tightened the hook end of the retainer is forced into gripping engagement with the frame flange 15, the edge 86 of which is forced into wedging contact with the angular or cam portion 85 of the inner hook portion of the retainer. At the same time the bushing plate 8 is forced against the web 5 which carries the bolt stem upward into squared position somewhat away from the frame flange 15 and this action may be controlled by forming a wedging or bearing member, such as 82, for instance, on the bushing extension for contact with the web or flange. In this way one of the points of contact is made by the interposed bushing and a similarly desirable resiliently gripping engagement is secured between each of the retainers and the frame member, each hook bolt being forced and securely held in squared or alined relation to the frame flange.

Fig. 19 shows another form of retainer which is specially adapted for use on automobiles where the splash pan or other connected parts are closely adjacent the frame flange to which the retainer is secured. The bolt stem 9 is upwardly deflected at about the point 97 so that the curved hook member 13 of the retainer is upwardly displaced and the hook 87 located about in line with the center of this small diameter inner curve 98 of the hook that is approximately in line or alined therewith in a direction parallel to the coöperating flange or to the end of the bolt stem or shank. Under these circumstances the portion 99 of the bolt stem may directly engage the frame flange 15 so that a direct three-point engagement is secured between the flange and retainer which also has wedging engagement therewith at the point 86. If desired, the hook may be formed with a relieved or beveled end 91 and can thus be brought still nearer to the frame web 5 which is desirable in case the flanges are narrow. The hook portion of the retainer thus extends to a minimum distance beyond the frame flange so that it will interfere to a correspondingly less extent with a closely arranged splash pan, for instance.

Another arrangement is shown in Fig. 20 in which the hook end 87 is also lowered sufficiently so that it comes nearly in line with the center of the inner curve 93 of the retainer hook on which a similarly relieved or beveled end 91 may be formed, if desired. The bushing may, if desired, be formed with a heavy or considerably projecting bearing member 106 which may be arranged in inclined wedging position so as to engage the frame flange and wedge the bushing upward when the parts are tightened. In this case as in preceding forms the bushing or bearing device has a more or less V section and extends around and more or less engages the frame web and outer side of the frame flange opposite to the hook bolt end. This device thus has several points of bearing on the outer surfaces of the frame member so that they can supplement or replace the points of bearing of the retainer on the frame member and correspondingly promote the rigidity of the attachment secured.

These bushing or bearing devices can thus be prevented from having any substantial angular movement with respect to the frame member or hook bolt during the tightening operation and it is of course desirable to have the bearing element so connected or coöperating with the retainer or other parts that the bearing plate cannot turn or move out of proper engagement with the frame member while the attaching device is being tightened. For some purposes it is desirable to form the retainer and bearing device with coöperating portions to form a modified pin and slot connection so as to prevent substantial angular movement between them; and this arrangement may be used with any of these types of hook bolt retainers. As shown in Figs. 21 to 23 the generally similar retainer having the hook end 87 which may have a relieved or beveled portion 91 adjacent the web 5 as indicated, may have such a slotted alining connection with its bearing element. The bolt stem 9 may be maintained in angular alinement with the bushing by any suitable alining means, such, for example, as the alining lug 103 which may be pinched up or otherwise formed on the bolt stem and which may engage a slot or recess 102 extending into the bushing 100 considerably beyond the bolt hole 20 therein, which may be somewhat obliquely or angularly arranged if desired. This arrangement prevents the bushing turning or getting out of angular alinement with the retainer stem and other parts during adjustment and tightening and also further minimizes the working loose of the parts under service conditions. As indicated in Fig. 21 this retainer may be used in connection with and may engage either flange of the frame member and comes into wedging engagement therewith at about the point 86 while the hook end engages the inside of the frame flange and exerts a resilient holding action thereon by reason of the springy character of the retainer. The interposed bushing or bearing plate 8 which may be used, if desired, constitutes the other bearing point with this arrangement and promotes the squared or alined relation between the retainer and frame flange, although, of course, it is not necessary in all cases to use such an interposed bushing device. This form of retainer can also be used on the forward portion of the automobile frame member where it is reinforced by the bolted on frame end 105 as shown in Figs. 7 and 22. In that event the hooked end 87 engages this frame end or reinforcing member 105 while the retainer has wedging engagement with the frame web, for instance, at about the point 86, the bolt stem or shank 9 being in this case located considerably closer to the upper or outer surface 92 of the frame flange 15. If desired the bushing may be formed with a wedging or inclined bearing portion 107 to engage the outside face 92 of the frame flange and if desired the squared surface 104 may be formed adjacent the bearing plate 8 as is shown in Fig. 22 so that this bearing element or member comes into direct engagement with the two outer sides of the frame member. This naturally promotes the rigidity of alinement and secure connection effected, and for these purposes it is sometimes desirable to have this bearing portion 104 somewhat removed from the shank of the U-bolt as shown in Fig. 3 to give greater alining action. However, when this universal type of retainer directly engages the frame flange as shown in Fig. 21, the flange engages the curved inner face of the hook nearer the center of this curve, since the hook end 87 is substantially in line with the center of this hook curve, that is, in a direction extending parallel to the retainer stem or shank. This contact preferably takes place at such point, however, as to have efficient wedging action in connection therewith; and for these reasons the retainer extends considerably less beyond the flange so as to interfere to a correspondingly less extent with an adjacent splash pan under these conditions. It is, of course, understood that the rearwardly extending supporting bars or members, such as 2, of the Lyon spring type or other buffers tend to maintain their substantial parallelism with each other and to resist twisting so that the retainer devices are usually assisted in this way in maintaining their alined position on the frame members and are prevented from swinging down around the frame flanges or webs.

The present application is a continuation in part of my co-pending applications, Serial No. 90,604, filed April 12, 1916, and Serial No. 135,524, filed December 7, 1916; that is, this application comprises subject-matter taken therefrom.

This invention has been described in connection with a number of illustrative embodiments, forms, shapes, proportions, sizes, materials and arrangements, to the details of which disclosure the invention is not of course to be limited, since what is claimed as new and what is desired to be secured by Letters Patent is set forth in the appended claims.

I claim—

1. In automobile buffers, an automobile having flanged frame members, a buffer having extending supporting members, retainers having threaded stems, each of said retainers having a hooked end to curve around one of the flanges of said frame members and having an end to engage the inner side of said frame flange, said hook end being substantially in line with the center of the inner curve of the hooked end of said retainer, said hook end being sufficiently out of line with the shank of said retainer to bridge over a frame flange and connected frame end when said retainer is applied adjacent the end of the automobile frame member, an alining lug formed on the stem of said retainer, a bushing having a bearing plate to coöperate with the web of said frame member and having an oblique bolt hole through which said retainer extends, there being an alining slot in said bushing with which said lug coöperates, said bushing having inclined wedging bearing portions on each side of said retainer and squared bearing portions adjacent said bearing plate to engage the outside of the frame flange adjacent the web, and a nut coöperating with the threaded end of said retainer to clamp said supporting member and bushing to the coöperating frame member, and force the edge of the flange of said frame member into wedging engagement with said retainer substantially adjacent the center of its hooked end to minimize projection of said retainer beyond said flange.

2. In automobile buffers, an automobile having flanged frame members, a buffer having extending supporting members, retainers having threaded stems, each of said retainers having a hooked end to extend around one of the flanges of said frame members and engage the inner side of said frame flange, said hook end being substantially in line with the center of the inner curve of the hooked end of said retainer, an alining lug formed on the stem of said retainer, a bushing having a bearing plate to coöperate with the web of said frame member and having a bolt hole through which said retainer extends, there being an alining slot in said bushing with which said lug coöperates, said bushing having squared bearing portions adjacent said bearing plate to engage the outside of the frame flange adjacent the web, and a nut coöperating with the threaded end of said retainer to clamp said supporting member and bushing to the coöperating frame member.

3. In automobile buffers, an automobile having flanged frame members, a buffer having extending supporting members, retainers having threaded stems, each of said retainers having a hooked end to extend around one of the flanges of said frame members and engage the inner side of said frame flange, a bushing having a bearing plate to coöperate with the web of said frame member and having a bolt hole through which said retainer extends, there being alining means on said retainer and bushing to prevent substantial relative angular movement thereof, and a nut coöperating with the threaded end of said retainer to clamp said supporting member and bushing to the coöperating frame member.

4. In automobile buffers, an automobile having flanged frame members, a buffer having extending supporting members formed with apertures, retainers having threaded stems coöperating with said apertures, each of said retainers having a hooked end to extend around one of the flanges of said frame members and having an end to engage the inner side of said frame flange, a bushing having a bearing plate to coöperate with the web of said frame member and having an oblique bolt hole through which said retainer extends, said bushing having inclined wedging bearing portions on each side of said retainer and squared bearing portions adjacent said bearing plate to engage the outside of the frame flange adjacent the web and a nut coöperating with the threaded end of said retainer to clamp said supporting member and bushing to the coöperating frame member, and force the edge of the flange of said frame member into wedging engagement with said retainer substantially adjacent the center of its hooked end to minimize projection of said retainer beyond said flange.

5. In automobile buffers, an automobile having flanged frame members, a buffer having extending supporting members, retainers having threaded stems, each of said retainers having a hooked end to extend around one of the flanges of said frame members and engage the inner side of said frame flange, a bushing having a bearing plate to coöperate with the web of said frame member and having an oblique bolt hole through which said retainer extends, said bushing having squared bearing portions adjacent said bearing plate to engage the outside of the frame flange adjacent the web, and a nut coöperating with the threaded end of said retainer to clamp said bushing to the coöperating frame member.

6. In automobile buffers, an automobile having flanged frame members, a buffer having extending supporting members, retainers having threaded stems, each of said retainers having a hooked end to extend around one of the flanges of said frame members and engage the inner side of said frame flange, a bearing plate to coöperate with the web of said frame member and having an oblique bolt hole through which said retainer extends, and a nut coöperating with the threaded end of said retainer to clamp said bearing plate to the coöperating frame member.

7. In automobile buffers, a buffer having front impact members and rearwardly extending supporting members and a plurality of hook retainer members having shanks coöperating with said supporting members and reversibly arranged with respect thereto, so that said retainer members are adapted to engage the flanged frame members of an automobile, the end hook portions of said retainers being sufficiently out of line with the shanks thereof to bridge over a frame flange and connected frame end when the retainer is applied adjacent the end of the automobile frame member.

8. In automobile buffers, a buffer having rearwardly extending supporting members and a plurality of hook retainer members having shanks coöperating with said supporting members so that said retainer members are adapted to engage the flanged frame members of an automobile, the end hook portions of said retainers being sufficiently out of line with the shanks thereof to bridge over a frame flange and connected frame end when the retainer is applied adjacent the end of the automobile frame member.

9. In automobile buffers, an automobile having flanged frame members, a buffer having supporting members, retaining members having threaded shanks, each of said retaining members having a hooked portion to extend around one of the flanges of said frame members and having a hook end to engage the inner side of said frame flange, said hook end being substantially in line with the center of the inner curve of the hooked portion of said retainer, a bearing plate to coöperate with the web of said frame member and having a bolt hole through which said retainer shank extends and a nut coöperating with the threaded end of said retainer shank to clamp said bearing plate to the coöperating frame member and force the edge of the flange of said frame member into wedging engagement with said retainer substantially adjacent the center of its curved hooked portion to minimize projection of said retainer beyond said flange.

10. In automobile buffers, an automobile having flanged frame members, a buffer having supporting members, retaining members having threaded shanks, each of said retaining members having a hooked portion to extend around one of the flanges of said frame members and having a hook end to engage the inner side of said frame flange, a bearing plate to coöperate with the web of said frame member and having a bolt hole through which said retainer shank extends, and a nut coöperating with the threaded end of said retainer shank to clamp said bearing plate to the coöperating frame member and force the edge of the flange of said frame member into engagement with said retainer adjacent the center of its curved hook portion to minimize projection of said retainer beyond said flange.

11. In attaching devices adapted for use in attaching automobile buffers to the frame of an automobile having flanged frame members, a one-piece self alining hook bolt retainer having a hooked portion adapted to curve around one of the flanges of said frame members and having a hook end adapted to engage the inner side of said frame flange, said hook end being relieved and located substantially in line with the center of the inner curve of the hooked portion of said retainer, an alining lug formed on the stem of said retainer, a bushing having a bearing plate adapted to coöperate with the web of said frame member and having an oblique bolt hole through which said retainer extends, there being an alining slot in said bushing with which said lug coöperates, and a nut coöperating with a threaded end of said retainer and adapted to clamp said bushing to the coöperating frame member and force the edge of the flange of said frame member into wedging engagement with said retainer substantially adjacent the center of its curved hooked portion to minimize projection of said retainer beyond said flange.

12. In attaching devices adapted for use in attaching automobile buffers to the frame of an automobile having flanged frame members, a one-piece hook bolt retainer having a hooked portion adapted to curve around one of the flanges of said frame members and having a hook end adapted to engage the inner side of said frame flange, said hook end being relieved and located substantially in line with the center of the inner curve of the hooked portion of said retainer, a bushing having a bearing plate adapted to coöperate with the web of said frame member and having a bolt hole through which said retainer extends, and a nut coöperating with a threaded end of said retainer and adapted to clamp said bushing to the coöperating frame member and force the edge of the flange of said frame member into wedging engagement with said retainer substantially adjacent the center of its curved hooked portion to minimize projection of said retainer beyond said flange.

13. In attaching devices adapted for use in attaching automobile buffers to the frame of an automobile having flanged frame members, a one-piece hook bolt retainer having a hooked portion adapted to curve around one of the flanges of said frame members and having a hook end adapted to engage the inner side of said frame flange, said hook end being located substantially in line with the center of the inner curve of the hooked portion of said retainer, a bearing plate adapted to coöperate with the web of said frame member and having a bolt hole through which said retainer extends and a nut coöperating with a threaded end of said retainer and adapted to clamp said bushing to the coöperating frame member and force the edge of the flange of said frame member into wedging engagement with said retainer to minimize projection of said retainer beyond said flange.

14. In attaching devices adapted for use in attaching automobile buffers to the frame of an automobile having flanged frame members, a one-piece hook bolt retainer having a hooked portion adapted to extend around one of the flanges of said frame members and having a hook end adapted to engage an inner side of said frame member, an alining lug formed on the stem of said retainer, a bushing having a bearing portion adapted to coöperate with the web of said frame member and having an oblique bolt hole through which said retainer extends, there being an alining slot in said bushing with which said lug coöperates and a nut coöperating with a threaded end of said retainer and adapted to clamp said bushing to the coöperating frame member and force the edge of the flange of said frame member into wedging engagement with said retainer.

15. In attaching devices adapted for use in attaching automobile buffers to the frame of an automobile having flanged frame members, a one-piece hook bolt retainer having a hooked portion adapted to extend around one of the flanges of said frame members and having a hook end adapted to engage an inner side of said frame member, an alining lug formed on the stem of said retainer, a bushing having a bearing portion adapted to coöperate with the web of said frame member and having a hole through which said retainer extends, there being alining means on said stem and bushing to prevent undesirable angular movement between them, and a nut coöperating with a threaded end of said retainer and adapted to clamp said bushing to the coöperating frame member and force the edge of said frame member into wedging engagement with said retainer.

16. In attaching devices adapted for use in attaching automobile buffers to the frame of an automobile having flanged frame members, a one piece hook retaining member having a threaded stem and having a hooked end to extend around one of the flanges of said frame members and having an end to engage the inner side of said frame flange, a bushing having a bearing plate to coöperate with the web of said frame member, said bushing having inclined wedging bearing portions adjacent said retainer and squared bearing portions adjacent said bearing plate to engage the outside of the frame flange adjacent the web and a nut coöperating with the threaded stem of said retainer to clamp said supporting member and bushing to the coöperating frame member, and force the edge of the flange of said frame member into wedging engagement with said retainer.

17. In attaching devices adapted for use in attaching automobile buffers to the frame of an automobile having flanged frame members, a one piece hook retaining member having a threaded stem and having a hooked end to extend around one of the flanges of said frame member and having an end to engage the inner side of said frame flange, a bushing having a bearing plate to coöperate with the web of said frame member, said bushing having inclined wedging bearing portions adjacent said retainer and a nut coöperating with the threaded stem of said retainer to clamp said supporting member and bushing to the coöperating frame member, and force the edge of the flange of said frame member into engagement with said retainer.

18. In attaching devices adapted for use in attaching automobile buffers to the frame of an automobile having flanged frame members, a one piece hook retaining member having a threaded stem and having a hooked end to extend around one of the flanges of said frame members and having an end to engage the inner side of said frame flange, a bushing having a bearing plate to coöperate with the web of said frame member and having an oblique bolt hole through which said retainer extends, and a nut coöperating with the threaded stem of said retainer to clamp said supporting member and bushing to the coöperating frame member, and force the edge of the flange of said frame member into engagement with said retainer.

GEORGE ALBERT LYON.

Witnesses:
 HARRY L. DUNCAN,
 JESSIE B. KAY.